(12) United States Patent
Taylor

(10) Patent No.: US 9,885,371 B2
(45) Date of Patent: Feb. 6, 2018

(54) ROW OF AEROFOIL MEMBERS

(71) Applicant: ROLLS-ROYCE PLC, London (GB)

(72) Inventor: James Vincent Taylor, Cambridge (GB)

(73) Assignee: ROLLS-ROYCE plc, London (GB)

( * ) Notice: Subject to any disclaimer, the term of this patent is extended or adjusted under 35 U.S.C. 154(b) by 304 days.

(21) Appl. No.: 14/876,357

(22) Filed: Oct. 6, 2015

(65) Prior Publication Data

US 2016/0115972 A1 Apr. 28, 2016

(30) Foreign Application Priority Data

Oct. 24, 2014 (GB) .................................. 1418948.4

(51) Int. Cl.
*F04D 29/68* (2006.01)
*F01D 5/14* (2006.01)
(Continued)

(52) U.S. Cl.
CPC ........... *F04D 29/681* (2013.01); *F01D 5/143* (2013.01); *F01D 9/041* (2013.01); *F04D 29/324* (2013.01); *F05D 2220/323* (2013.01); *F05D 2240/12* (2013.01); *F05D 2240/30* (2013.01); *F05D 2240/80* (2013.01); *Y02T 50/673* (2013.01)

(58) Field of Classification Search
CPC .... F04D 29/681; F04D 29/324; F04D 29/329; F01D 9/041; F01D 5/143; F01D 5/34; F01D 5/10; Y02T 50/673; F05D 2220/323; F05D 2240/12; F05D 2240/30; F05D 2240/80; F05D 2200/26; F05D 2200/261; F05D 2200/262; F05D 2200/263;
(Continued)

(56) References Cited

U.S. PATENT DOCUMENTS 6,017,186 A * 1/2000 Hoeger .................. F01D 5/143
415/181
6,283,713 B1 9/2001 Harvey et al.
(Continued)

FOREIGN PATENT DOCUMENTS

DE 10 2008 021053 A1 10/2009
EP 1712737 A1 10/2006
(Continued)

OTHER PUBLICATIONS

Mar. 26, 2015 Search Report issued in British Patent Application No. 1418948.4.
(Continued)

*Primary Examiner* — Woody Lee, Jr.
*Assistant Examiner* — Adam W Brown
(74) *Attorney, Agent, or Firm* — Oliff PLC

(57) ABSTRACT

A row of aerofoil members for an axial compressor, the row comprises a circumferentially extending endwall and a plurality of aerofoils extending radially from the endwall. The endwall is profiled to include an acceleration region and a deceleration region in a location that corresponds to a position of peak fluid pressure. The acceleration region is provided upstream of the deceleration region such that fluid flow through the compressor and adjacent the endwall is accelerated and then decelerated so as to reduce the peak fluid pressure.

13 Claims, 4 Drawing Sheets

(51) Int. Cl.
*F01D 9/04* (2006.01)
*F04D 29/32* (2006.01)

(58) Field of Classification Search
CPC ......... F05D 2200/264; F05D 2250/711; F05D 2250/73; F05D 2250/713; F05D 2260/96
See application file for complete search history.

(56) References Cited

U.S. PATENT DOCUMENTS

| | | | | |
|---|---|---|---|---|
| 6,524,070 | B1* | 2/2003 | Carter | F01D 5/141 416/193 A |
| 7,354,243 | B2* | 4/2008 | Harvey | F01D 5/143 415/191 |
| 8,192,154 | B2* | 6/2012 | Sonoda | F01D 5/145 415/191 |
| 8,439,643 | B2* | 5/2013 | Kuhne | F01D 5/143 416/193 A |
| 8,678,740 | B2* | 3/2014 | Praisner | F01D 5/143 415/1 |
| 8,985,957 | B2* | 3/2015 | Mahle | F01D 5/143 416/193 A |
| 9,200,638 | B2* | 12/2015 | Boston | F01D 5/143 |
| 9,453,415 | B2* | 9/2016 | Engel | F01D 5/12 |
| 9,470,094 | B2* | 10/2016 | Mahle | F01D 5/143 |
| 9,518,467 | B2* | 12/2016 | Guimbard | F01D 5/143 |
| 2002/0127108 | A1* | 9/2002 | Crall | B23K 20/129 416/213 R |
| 2003/0170124 | A1* | 9/2003 | Staubach | F01D 5/142 416/193 A |
| 2007/0059177 | A1 | 3/2007 | Harvey | |
| 2007/0258810 | A1* | 11/2007 | Aotsuka | F01D 5/143 415/206 |
| 2008/0267772 | A1 | 10/2008 | Harvey et al. | |
| 2010/0172749 | A1* | 7/2010 | Mitsuhashi | F01D 5/143 415/193 |
| 2011/0064580 | A1* | 3/2011 | Barnes | F01D 5/143 416/204 A |
| 2011/0189023 | A1* | 8/2011 | Guimbard | F01D 5/143 416/223 R |
| 2012/0201688 | A1* | 8/2012 | Mahle | F01D 5/143 416/235 |
| 2016/0208643 | A1* | 7/2016 | Praisner | F01D 25/24 |

FOREIGN PATENT DOCUMENTS

| | | |
|---|---|---|
| EP | 2136033 A1 | 12/2009 |
| EP | 2 187 000 A1 | 5/2010 |
| EP | 2713013 A1 | 4/2014 |
| WO | 2013/009449 A1 | 1/2013 |
| WO | 2014/074190 A2 | 5/2014 |

OTHER PUBLICATIONS

Apr. 19, 2016 European Search Report issued in European Patent Application No. 15188508.

* cited by examiner

ROW OF AEROFOIL MEMBERS

FIELD OF INVENTION

The present invention relates to a row of aerofoil members, a compressor and/or a gas turbine engine.

BACKGROUND

Gas turbine engines are typically employed to power aircraft. Typically a gas turbine engine will comprise an axial fan driven by an engine core. The engine core is generally made up of one or more turbines which drive respective compressors via coaxial shafts. The fan is usually driven directly off an additional lower pressure turbine in the engine core.

The engine core comprises a compressor and a turbine, each of which have a plurality of rows of radially extending aerofoil members in the form of blades and stators. The aerofoils use surface curvature to change the static pressure of flow and thus provide lift. Such aerofoil rows suffer from secondary flows that arise on endwalls of the aerofoils and produce losses.

Friction on annular walls of flow passages (defined between two adjacent aerofoils) creates a boundary layer of slower moving air. As this air passes between the aerofoils it is more strongly influenced by the pressure gradient between the lower and upper surfaces of adjacent aerofoils, whereas the faster air outside the boundary layer is in equilibrium with the pressure gradient and is turned to the design exit flow angle. The slow boundary layer airflow may be over-turned (that is, turned further than the design angle) and rolled up into vortices, creating secondary flows that result in aerodynamic losses.

In compressors the problems associated with these secondary flows are exacerbated because generally compressor aerofoil rows diffuse the flow. Typically, the over-turned boundary layer will not simply roll up into a vortex, but additionally a region of separated flow will form in the corner between the aerofoil suction surface and the endwall. In parts of this separated region, the airflow may be reversed.

This corner separation is a source of significant losses, typically larger than the losses arising from "standard secondary flows" (such as in turbines). Corner separation may also cause significant blockage of the flow, reducing the mass flow delivered by the compressor. Furthermore, the presence of the secondary flow and corner separation causes the flow angle at exit from the row to deviate from the design angle. Consequently, the incidence angle of the flow onto the next aerofoil row deviates from its design angle, reducing that row's aerodynamic efficiency.

SUMMARY OF INVENTION

The present invention seeks to provide a row of aerofoil members that mitigate one or more of the above mentioned problems.

A first aspect provides a row of aerofoil members for an axial compressor, the row comprising a circumferentially extending endwall; and a plurality of aerofoils extending radially from the endwall. The endwall is profiled to include an acceleration region and a deceleration region in a location that corresponds to a position of (operational/in use) peak fluid pressure, the acceleration region being provided upstream of the deceleration region such that, in use, fluid flow through the compressor and adjacent the endwall is accelerated and then decelerated so as to reduce the peak fluid pressure.

The endwall may include a depression at a location that corresponds to a position of peak fluid pressure. The endwall may include a plurality of depressions in locations that correspond to positions of peak fluid pressure. One or more depressions may be provided in a region adjacent each aerofoil member.

The depression may be a concave recess. Flow of fluid into the concave depression (e.g. along a portion of negative gradient) accelerates the fluid flow, and flow of fluid out of the concave depression (e.g. along a portion of positive gradient) decelerates the fluid flow.

The depressions may be provided upstream of the aerofoils. One depression may be provided upstream of each of the aerofoils.

One depression may be provided in a region adjacent the leading edge and adjacent a forward portion of a suction side of each aerofoil. For example, the depression may extend longitudinally from a region adjacent the leading edge of the aerofoil to a region adjacent the suction side of the aerofoil.

The depression may have a curved perimeter. For example, a portion of the perimeter adjacent the aerofoil may substantially follow the contour of the aerofoil.

The depressions may be dimensioned to have a ratio of length to depth equal to or less than 20. The ratio of length to depth may alternatively be referred to as the aspect ratio.

In exemplary embodiments the depressions may be dimensioned to have a ratio of length to depth equal to or between 1 and 20, for example equal to or between 5 and 20, or equal to or between 5 and 10.

When a depression is provided in a region adjacent the leading edge and a forward portion of a suction side of the aerofoil, the length is defined as the distance along a central axis extending from a leading edge side to a suction side of the depression.

The depression may extend to a region of a fillet provided between the aerofoil and endwall.

The leading edge of the aerofoil may be profiled to graduate into the depression.

The endwall may be profiled to include a raised bump positioned on the pressure side of the depression. The endwall may be profiled to include a raised bump positioned on the suction side of the depression. The raised bump may be considered to be a convex protrusion on the endwall.

A second aspect provides a row of aerofoil members for an axial compressor, the row comprising a circumferentially extending endwall; and a plurality of aerofoils extending radially from the endwall. The endwall includes a plurality of depressions positioned upstream of the aerofoils in locations corresponding to, in use, positions of peak fluid pressure.

The second aspect may include one or more of the optional features of the first aspect.

A third aspect provides a row of aerofoil members for an axial compressor, the row comprising a circumferentially extending endwall and a plurality of aerofoils extending radially from the endwall. The endwall is profiled to include one or more depressions, e.g. the one or more depressions may be provided in one or more locations that correspond to (in use) positions of peak fluid pressure. The depressions are dimensioned to have a ratio of length to depth equal to or less than 20.

The third aspect may include one or more of the optional features of the first aspect.

A fourth aspect provides a compressor comprising the row of aerofoil members according to the first, second and/or third aspect.

The row of aerofoils may be a row of stator vanes. The endwall may be formed by a shroud of a stator vane. The endwall may be formed by a casing from which the stator vane protrudes. The endwall may be formed by a platform from which the stator vanes protrude.

The row of aerofoils may be a row of rotor blades. The endwall may be formed by platforms from which the rotor blades protrude.

The depressions may be provided upstream of the aerofoils and downstream of an inter-platform gap.

A fifth aspect of the disclosure provides a gas turbine engine comprising the compressor of the fourth aspect.

DESCRIPTION OF DRAWINGS

The invention will now be described, by way of example only, with reference to the accompanying drawings in which.

DETAILED DESCRIPTION

Figure 1:
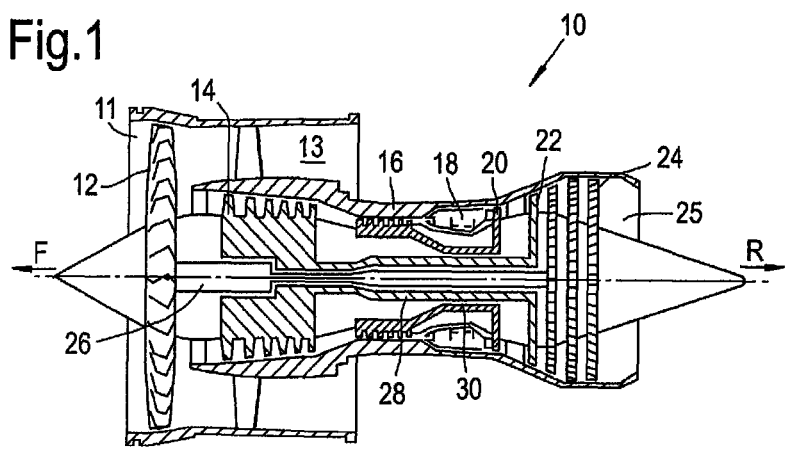
FIG. 1 illustrates a gas turbine engine.

Gas turbine engines may be turbofans or turbojets and may have various configurations. By way of example only the following describes a turbofan (or bypass gas turbine engine), but as will be appreciated by the person skilled in the art, the later described row of aerofoil members may be used in any type of gas turbine engine having any type of configuration. Referring to FIG. 1, a gas turbine engine is indicated generally at 10 and comprises, in axial flow series, an air intake duct 11, fan 12, a bypass duct 13, an intermediate pressure compressor 14, a high pressure compressor 16, a combustor 18, a high pressure turbine 20, an intermediate pressure turbine 22, a low pressure turbine 24 and an exhaust nozzle 25. The fan 12, compressors 14, 16 and turbines 20, 22, 24 all rotate about the major axis of the gas turbine engine 10 and so define the axial direction of the gas turbine engine.

Air is drawn through the air intake duct 11 by the fan 12 where it is accelerated. A significant portion of the airflow is discharged through the bypass duct 13 generating a corresponding portion of the engine thrust. The remainder is drawn through the core of the engine 10 through intermediate pressure compressor 14 where the air is compressed. A further stage of compression takes place in the high pressure compressor 16 before the air is mixed with fuel and burned in the combustor 18. The resulting hot working fluid is discharged through the high pressure turbine 20, the intermediate pressure turbine 22 and the low pressure turbine 24 in series where work is extracted from the working fluid. The work extracted drives the intake fan 12, the intermediate pressure compressor 14 and the high pressure compressor 16 via shafts 26, 28, 30. The working fluid, which has reduced in pressure and temperature, is then expelled through the exhaust nozzle 25 generating the remainder of the engine thrust.

Figure 2:
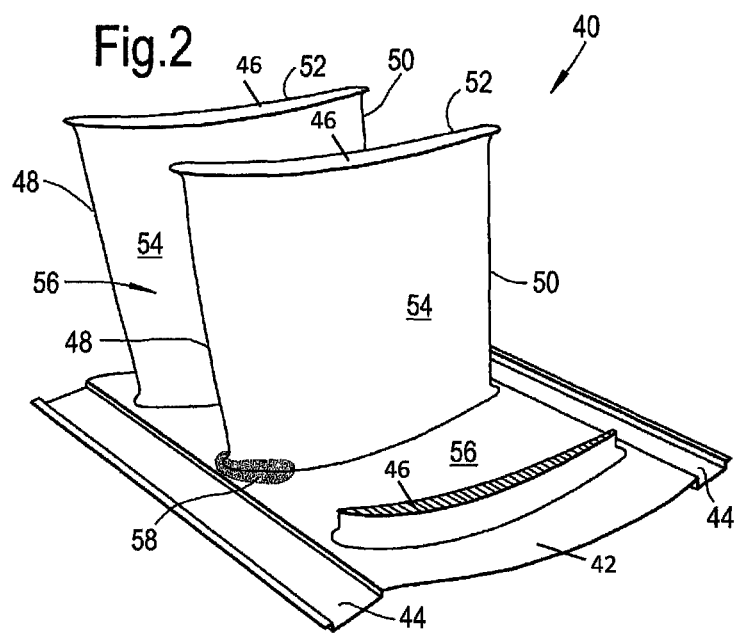
FIG. 2 illustrates a perspective view of a segment of a compressor including a platform and stators.

The compressor includes a series of segments connected to form an annulus. Referring to FIG. 2, a segment is indicated generally at 40. The segment includes a circumferentially extending endwall 42 that is defined by a platform of the segment.

The platform includes a channel 44 at the fore-end and rear-end of the platform. The channel 44 defines an inter-platform gap and, in use, a leakage jet.

A plurality of aerofoils 46 (which may also be referred to as blades) extend radially outwardly from the endwall 42. Each aerofoil 46 includes a leading edge 48 and a trailing edge 50. A pressure surface 52 and a suction surface 54 extend between the leading edge and trailing edge. A passageway 56 is defined between the suction face of one aerofoil and a pressure face of a neighbouring aerofoil. In the present embodiment the aerofoils form stators of the compressor.

The endwall 42 includes a depression 58. The depression 58 is positioned upstream of the aerofoil 46. The depression extends to be adjacent the leading edge 48 and adjacent a forward portion of the suction side 46 of the aerofoil. In the present embodiment the depression extends to include a fillet region between the endwall and the aerofoil.

Figure 3:
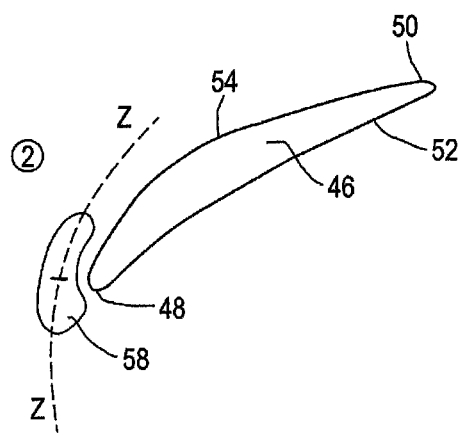
FIG. 3 illustrates a plan view of a depression formed in an endwall of the segment of FIG. 2.
Figure 4:
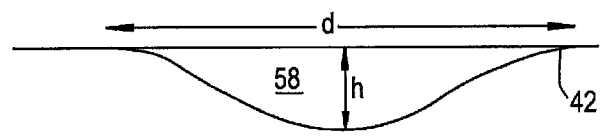
FIGS. 4 and 5 illustrate alternative cross-sections of the depression along the line Z-Z of FIG. 3.

Referring now to FIGS. 3 and 4, the depression is an elongate depression extending from a region upstream of the leading edge (referred to from hereon in as the leading edge region) to a region adjacent a forward portion of the suction surface (referred to from hereon in as the suction side region). In plan view, the elongate shaped depression has curved ends as well as having a centre line that curves from the leading edge region to the suction side region with a similar curvature to that of the aerofoil in the region of the leading edge and forward portion of the suction surface.

The depression 58 has a curved profile in the radial direction so as to provide a smooth transition between gradient changes, e.g. the depression is concave. It has been found that the depression ideally has an aspect ratio equal to or less than 20, for example equal to or between 1 and 20, or between 5 and 20. That is, the length d of the depression, measured in the elongate direction (i.e. from the leading edge region towards the suction side region) is less than or equal to 20 times greater than the maximum depth h of the depression.

Figure 5:
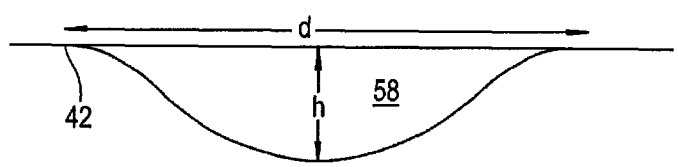

An alternative profile for a depression 58 is shown in FIG. 5.

The described embodiment has been found to relieve the magnitude of diffusion local to the endwall by the provision of the depression. Reducing the amount of diffusion can reduce the corner separation and improve aerodynamic efficiency and performance.

Figure 6:
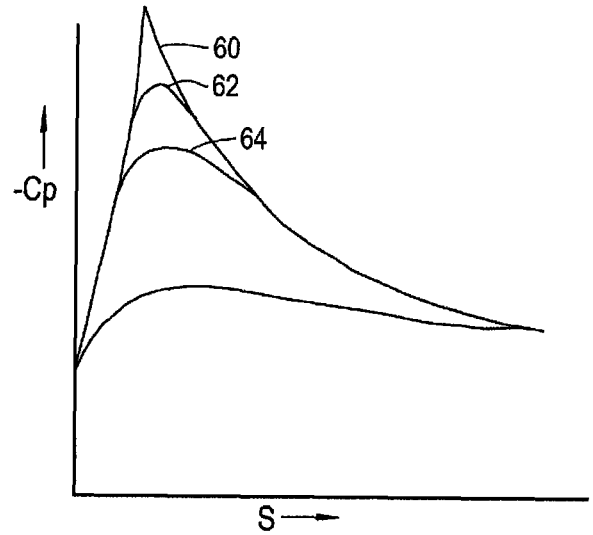
FIG. 6 illustrates a variation in pressure coefficient $C_p$ with position s along the fluid flow for an arrangement of the prior art and for the depression illustrated in FIGS. 3 to 5.

Referring to FIG. 6, a graph of the pressure coefficient $-C_P$ against a position in the fluid flow is shown. The variation in pressure coefficient for a compressor without a depression in the endwall is indicated at line 60; the variation in pressure coefficient for the compressor having the depression shown in FIG. 4 is indicated at line 62; and the variation in pressure coefficient for the compressor having the depression shown in FIG. 5 is indicated at line 64. As can be seen in FIG. 6, a high skew in the endwall boundary layer fluid can cause front loading of the aerofoil close to the endwall and a large pressure spike. As shown in FIG. 6, the magnitude of the peak pressure is reduced with the presence of the depression of FIG. 4 and is further reduced with the presence of the depression of FIG. 5.

Figure 7:
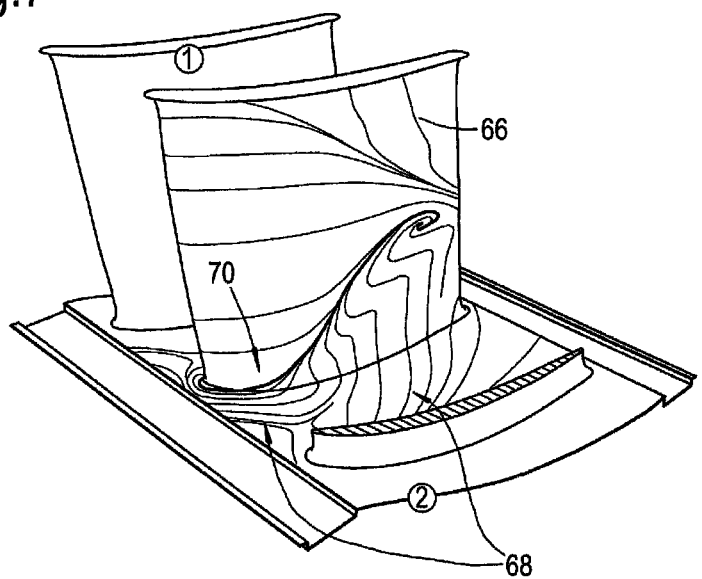
FIG. 7 illustrates a perspective view of the segment of FIG. 2 showing surface streamlines.

Referring to FIG. 7, flow streamlines are indicated at 66 (only one labelled for clarity) and the secondary flow is indicated generally at 68. A limiting streamline diffusion is indicated at 70. As illustrated in FIG. 7, a reduction in the pressure spike diffusion reduces a momentum deficit in the aerofoil boundary layer in the vicinity of the limiting streamline 70 resulting in a smaller size of corner separation.

Previously, compressor efficiency and performance has been addressed by contouring the endwall (e.g. in the region of a passageway provided between aerofoils), but such methods of endwall contouring have focussed on attempting to reduce the strength of the secondary flow through changes in the pressure field on the endwall itself. Flow control has been used to remove low momentum fluid on the endwall to stop it impacting on the blade boundary layer.

The described embodiment differs from previous approaches because it reduces the size of the corner separation at design flow rates and improves stall margin by reducing the diffusion undergone by the blade boundary layer local to the interface between blade boundary layer and endwall boundary layer. The better condition of flow on the blade surface will counter driving force towards large separations caused by the secondary flow.

Figure 8:
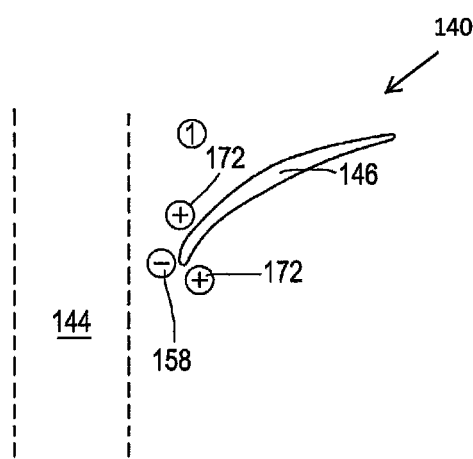
FIG. 8 illustrates a schematic plan view of an alternative segment of a compressor.

Referring to FIG. 8, an alternative arrangement of compressor segment is indicated generally at 140. Similar reference numerals as to those used for the previously described embodiments are used for reference to similar features of the embodiment of FIG. 7, but with a prefix "1" to distinguish between embodiments.

In the embodiment of FIG. 8, bumps 172 are provided adjacent the depression 158. One bump is provided towards a pressure side of the depression and one bump is provided towards a suction side of the depression. The depression is a concave feature of the endwall and the bumps are convex features of the endwall. The bumps help to smooth out (or flatten) the pressure profile. The bumps may have any suitable profile. The bumps may have a length to height ratio equal to or between 1 to 20, 5 to 20, or 5 to 10.

It will be appreciated by one skilled in the art that, where technical features have been described in association with one or more embodiments, this does not preclude the combination or replacement with features from other embodiments where this is appropriate. Furthermore, equivalent modifications and variations will be apparent to those skilled in the art from this disclosure. Accordingly, the exemplary embodiments of the invention set forth above are considered to be illustrative and not limiting.

The principle of providing a depression in a region of peak pressure has been described with respect to stators and an endwall being defined by a platform, but in alternative embodiments the endwall may be defined by a shroud or a casing. Further alternatively, the aerofoil may be a rotor blade. When the aerofoil is a rotor blade, the endwall may be defined by a platform, or a portion of an integrally formed bladed disk or bladed ring.

The invention claimed is:

1. A row of aerofoil members for an axial compressor, the row comprising:
   a circumferentially extending endwall; and
   a plurality of aerofoils extending radially from the endwall;
   wherein the endwall is profiled to include an acceleration region and a deceleration region in a location that corresponds to a position of peak fluid pressure, the acceleration region being provided upstream of the deceleration region such that fluid flow through the compressor and adjacent the endwall is accelerated and then decelerated so as to reduce the peak fluid pressure,
   wherein the endwall includes one or more depressions in one or more locations that correspond to positions of peak fluid pressure, and
   wherein the depressions are dimensioned to have a ratio of length to depth equal to or less than 20.

2. The row of aerofoil members according to claim 1, wherein the depressions are dimensioned to have a ratio of length to depth equal to or between 1 and 20.

3. The row of aerofoil members according to claim 1, wherein the depressions are dimensioned to have a ratio of length to depth equal to greater than 5.

4. The row of aerofoil members according to claim 1, wherein the depressions are dimensioned to have a ratio of length to depth equal to or between 5 and 10.

5. The row of aerofoil members according to claim 1, wherein the depressions are a concave recess.

6. The row of aerofoil members according to claim 1, wherein the depressions are provided upstream of the aerofoils.

7. The row of aerofoil members according to claim 6, wherein one depression is provided in a region adjacent the leading edge and adjacent a forward portion of a suction side of each aerofoil.

8. The row of aerofoil members according to claim 1, wherein the depression extends to a region of a fillet provided between the aerofoil and endwall.

9. The row of aerofoil members according to claim 8, wherein the leading edge of the aerofoil is profiled to graduate into the depression.

10. The row of aerofoil members according to claim 1, wherein the endwall is profiled to include a raised bump positioned on the pressure side and/or on the suction side of the depression.

11. A row of aerofoil members for an axial compressor, the row comprising:
    a circumferentially extending endwall; and
    a plurality of aerofoils extending radially from the endwall;
    wherein the endwall is profiled to include one or more depressions in one or more locations that correspond to positions of peak fluid pressure, and
    wherein the depressions are dimensioned to have a ratio of length to depth equal to or less than 20.

12. A compressor comprising the row of aerofoil members according to claim 11.

13. A gas turbine engine comprising the compressor according to claim 12.

* * * * *